United States Patent [19]

Bishop

[11] Patent Number: 5,724,712
[45] Date of Patent: *Mar. 10, 1998

[54] METHOD AND APPARATUS FOR AUTOMATED PROCESSING AND HANDLING OF WELDED SHEET METAL BLANKS

[76] Inventor: Bob R. Bishop, R.R. #3, Percywright Rd., Newmarket, Onario, Canada

[*] Notice: The term of this patent shall not extend beyond the expiration date of Pat. No. 5,634,255.

[21] Appl. No.: 728,381

[22] Filed: Oct. 9, 1996

Related U.S. Application Data

[63] Continuation-in-part of Ser. No. 358,528, Dec. 19, 1994, Pat. No. 5,634,255.

[30] Foreign Application Priority Data

Nov. 3, 1994 [CA] Canada .................. 2135038

[51] Int. Cl.⁶ .................. B21D 39/03; B23P 21/00; B23K 11/06
[52] U.S. Cl. .................. 29/430; 29/460; 29/527.4; 29/33 A; 29/33 B; 29/33 P; 29/783; 29/787; 29/795; 29/822; 219/79; 219/81; 219/83
[58] Field of Search .................. 29/429, 460, 527.4, 29/527.2, 783, 787, 786, 793, 795, 822, DIG. 23, DIG. 26, DIG. 48, DIG. 95, 563, 33 A, 33 B, 33 P, 430; 219/78.16, 79, 81, 83; 228/265, 125, 49.4; 72/196, 379.2; 271/193; 414/788.2, 795.3; 198/472.1, 690.1, 803.6

[56] References Cited

U.S. PATENT DOCUMENTS

| | | |
|---|---|---|
| 4,353,689 | 10/1982 | Fernandez et al. . |
| 4,412,122 | 10/1983 | Böhm et al. . |
| 4,584,457 | 4/1986 | Dilthey et al. . |
| 4,650,954 | 3/1987 | Frings et al. . |
| 4,728,766 | 3/1988 | Opprecht et al. . |
| 4,872,940 | 10/1989 | Strum et al. . |
| 5,081,331 | 1/1992 | Beyer et al. . |
| 5,098,005 | 3/1992 | Jäck . |
| 5,125,554 | 6/1992 | Geiermann et al. . |
| 5,131,581 | 7/1992 | Geiermann . |
| 5,190,204 | 3/1993 | Jäck et al. . |
| 5,204,505 | 4/1993 | Prange et al. . |
| 5,290,990 | 3/1994 | Bischofberger et al. . |
| 5,322,359 | 6/1994 | Kramer et al. . |
| 5,394,270 | 2/1995 | Sturm . |
| 5,634,255 | 6/1997 | Bishop .................. 29/430 |

FOREIGN PATENT DOCUMENTS 696048  10/1964  Canada .

*Primary Examiner*—David P. Bryant
*Attorney, Agent, or Firm*—Riches, McKenzie & Herbert

[57] ABSTRACT

A method and apparatus for automatically welding and handling welded tailored blank composites. The method comprises the steps of transferring first and second sheet component parts from respective input stacks to an assembly table of a welding machine. The sheet components are disposed in a butt joint or an overlapping lap joint configuration and the blanks are welded together along a weld seam thus defining a welded blank. The welded blank is conveyed in a timed step manner from the welding machine to an output stacking machine via a magnetic stepping conveyor and the blank is transferred from the conveyor to an output stack of completed blanks with a stacking machine. An apparatus is provided to carry out the method.

18 Claims, 4 Drawing Sheets

METHOD AND APPARATUS FOR AUTOMATED PROCESSING AND HANDLING OF WELDED SHEET METAL BLANKS

RELATED APPLICATIONS

This application is a continuation-in-part of U.S. patent application Ser. No. 08/358,528, which was filed on Dec. 19, 1994, now U.S. Pat. No. 5,634,255.

TECHNICAL FIELD

The invention is directed to an improved method, and apparatus for carrying out the method, of automatically processing and handling tailored sheet metal blanks.

BACKGROUND OF THE ART

Tailored sheet metal blanks conventionally consist of two or more metal sheets of equal or unequal thickness welded together along linear weld seams. As compared to sheet metal blanks of uniform thickness, tailored blanks have the advantage that the designer can more closely match the strength, ductility, corrosion resistance or other features to the requirements of a part design. For example, the designer can provide additional strength where required in portions of a stamped part, while minimizing the overall material used in other portions.

Tailored sheet metal blanks have conventionally been assembled, welded, processed and handled in individual stand-alone work stations.

For example, in a conventional processing operation, coils of sheet metal are slit and shear cut to component sizes and stacked. The component stacks are then transferred to a welding station, where they are welded together and the output weldments are restacked. If the linear weld seams are to be ground flush, the weldment stack is transferred to a grinding station where each weldment is handled again, ground, and restacked. For other operations, such as oiling the weld seam (for corrosion resistance), or dimpling the sheet metal weldments (to aid stacking of the stamped parts) individual stations and repetitive handling are conventionally required.

Significant inefficiencies result from the repeated handling and restacking involved in conventional manufacture of tailored blanks. The use of stand-alone work stations for each operation likely has evolved from the gradual increase in acceptance of tailored blank technology.

By introducing further and further improved steps in manufacture, the designer can optimize the final end use of the tailored blank. However, such increasing number of steps has created a demand for an integrated method of manufacture.

Since it may be necessary to form a dimple at any location on a blank of any shape or size within the maximum design, conventionally dimpling is performed in a large punch press which is sized to accommodate the entire maximum blank size. Such dies and presses are extremely large and expensive but have heretofore been considered necessary due to the size of blanks and the need to select a wide variety of dimple locations.

The use of conventional methods has the advantage that it is easily adapted to manufacture the widely varying sizes and configurations of weldments encountered in automobile part production for example. The use of individual operations allows flexibility in output and part design which counteracts the disadvantages of repeated handling described above.

Therefore, it is desirable to provide an integrated method and apparatus for manufacturing tailored blanks, which can accommodate a wide variety of weldment configurations and sizes. However, such a system must also be rapidly adapted to produce different parts to be economically feasible. Rapid changeover is especially essential with the widespread adoption of just-in-time manufacturing which does not allow for long production runs and the economies of scale conventionally encountered in sheet metal part production.

SUMMARY OF THE INVENTION

In accordance with the invention is provided a method and apparatus which address the aforementioned disadvantages in a novel manner.

The invention provides a method and apparatus for automatically welding and handling welded tailored blank composites. Each completed blank consists of two or more sheets of equal or unequal thickness welded together along weld seams. In this regard, the sheets may be mash welded along linear seams in a conventional manner, or alternately, the edge portions of sheets may be butt welded along linear or curved seams by butt welding apparatus such as arc welders, plasma welders or by laser welding apparatus.

The novel method comprises the steps of: transferring first and second sheet component parts from respective input stacks of said first and second component parts to an assembly table of a welding machine; assembling the sheet component parts disposed in an abutting joint configuration, wherein edge portions of the sheets are in a butt joint configuration or an overlapping lap joint configuration; welding the joint along a weld seam, thus defining a welded blank; conveying the welded blank in a timed step manner from the welding machine to an output stacking machine via a magnetic stepping conveyor; transferring the blank from the conveyor to an output stack of completed blanks with a stacking machine.

The apparatus according to the invention comprises: a welding machine including means for assembling the sheet components disposed in an abutting joint configuration wherein edge portions of said sheets are provided in an overlapping lap joint or butt joint configuration, and means for welding the joint along a weld seam thus defining a welded blank; stacking machine means for stacking completed blanks into an output stack; means for transferring first and second sheet component parts from respective input stacks of said first and second parts to said assembly table of the mash welding machine; and magnetic conveyor means for conveying the welded blank in a timed step manner from the welding machine to said stacking machine means.

The backbone of the apparatus is a stepped magnetic indexing conveyor which incrementally advances the welded tailored blanks through a series of optionally selected operations. The use of a magnetic stepping conveyor advantageously ensures that the blanks are securely held when they are conveyed from the welding machine without requiring mechanical clamping apparatus to secure the blanks. By avoiding mechanical clamping apparatus, the magnetic conveyor further facilitates the further processing of the composite blank. In particular, the absence of mechanical clamping apparatus enables the processing of the blank while it remains on the conveyor, as for example, by oil spraying, wire brushing, dimpling and the like.

If desired, the magnetic stepping conveyor may also be used to convey the sheet components from their supply stacks to the welding machine for welding.

The use of robots for handling and for positioning the dimpling presses provides a degree of flexibility unknown to date. Since the entire method can be preprogrammed and centrally controlled, all an operator need do is select a part number, ensure a continuous supply of components and remove the finished parts.

In most cases, the blanks are formed into complex shapes in separate stamping operations after processing. To aid in locating the blanks into stamping dies and to assist in stacking of the stamped parts, dimples are often required to be formed on the blanks prior to stamping. The novel dimpling station provided by the invention eliminates the need for large dies and presses by providing dimpling robots with relatively inexpensive C-frame punch presses mounted to the robot arms. The dimpling robots may be programmed to position a dimple at any location by inserting the edge of the blank into the throat of the C-frame press.

Since the parameters of each weldment can be individually selected and carried out by robotics and computer programming, the method provides an almost limitless flexibility. For example, left and right parts can be assembled and stacked together for increased efficiency during final assembly. If desired, each successive weldment produced can be completely different, thereby eliminating the need for long production runs of identical parts which are then stockpiled. As a result, inventory can be minimized and the changes dictated by customers can be quickly accommodated.

Accordingly, in one aspect the present invention resides in a method of automatically welding and handling welded tailored blank composites, each completed blank composite consisting of two or more sheet component parts of equal or unequal thickness welded together along weld seams, the method comprising the steps of:

transferring first and second sheet component parts from respective input stacks of said first and second sheet component parts to a welding machine;

assembling the sheet component parts disposed in an abutting joint configuration;

welding the joint along a weld seam thus defining a welded blank composite;

conveying the welded blank composite in a timed step manner from the welding machine to an output stacking machine via a magnetic stepping conveyor; and transferring the welded blank composite from the conveyor to an output stack of completed composites with a stacking machine.

In another aspect the invention resides in an apparatus for automatically welding and handling welded tailored blank composites, each completed blank composite consisting of two or more sheet component parts of equal or unequal thickness welded together along weld seams, the apparatus comprising:

a welding machine having an assembly table including means for assembling the sheet component parts disposed in an abutting joint configuration and means for welding the joint along a weld seam, thus defining a welded blank composite;

stacking machine means for stacking completed blank composites into an output stack;

means for transferring first and second sheet component parts from respective input stacks of said first and second parts to said assembly table of the welding machine; and magnetic conveyor means for conveying the welded blank composite in a timed step manner from the welding machine to said stacking machine means.

BRIEF DESCRIPTION OF THE DRAWINGS

In order that the invention may be readily understood, one preferred embodiment of the invention and variations thereof will be described by way of example, with reference to the accompanying drawings wherein.

DETAILED DESCRIPTION OF PREFERRED EMBODIMENTS

Figure 1:
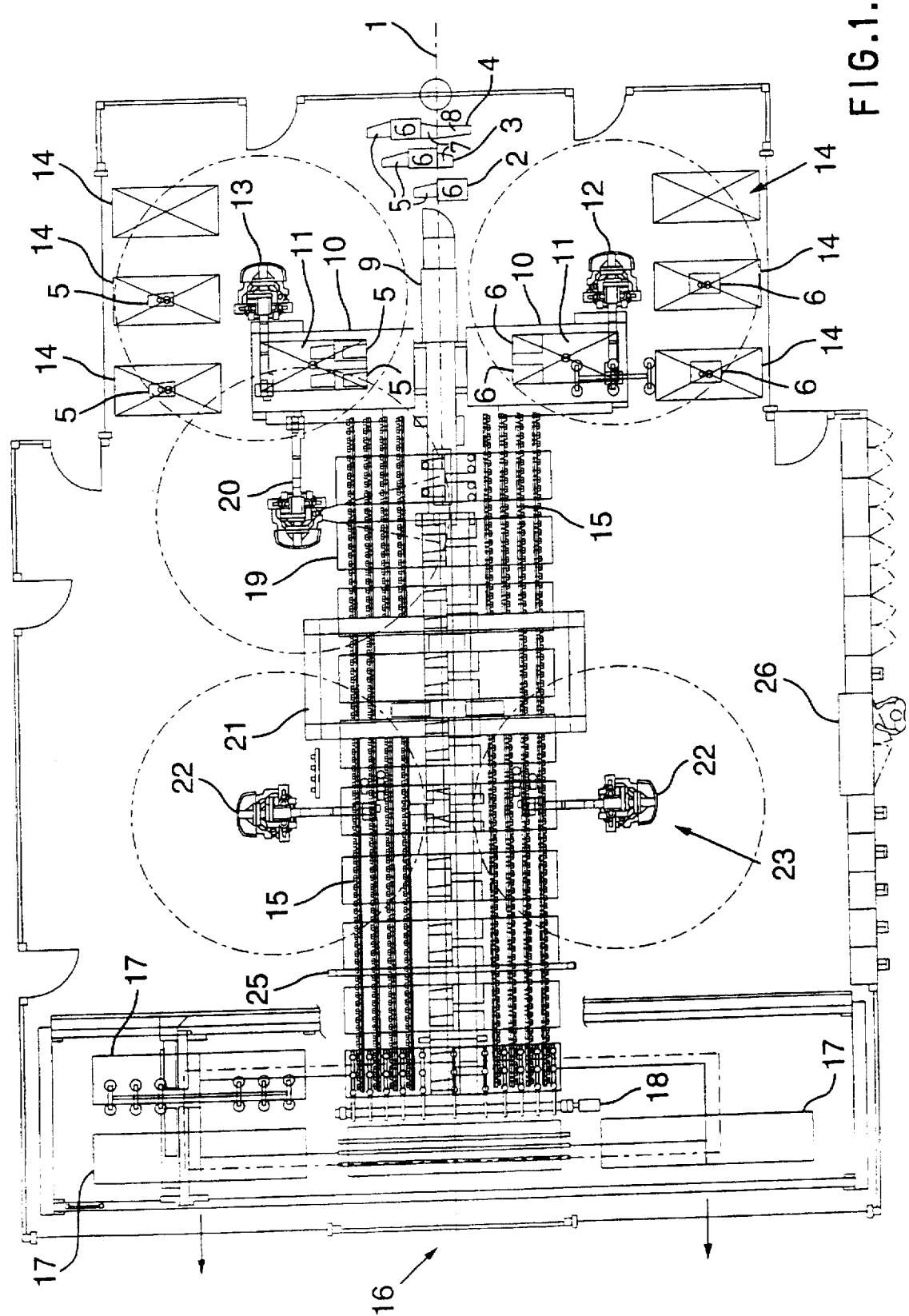
FIG. 1 is a plan view of an automated processing and handling apparatus for assembling tailored sheet metal blanks.
Figure 2:
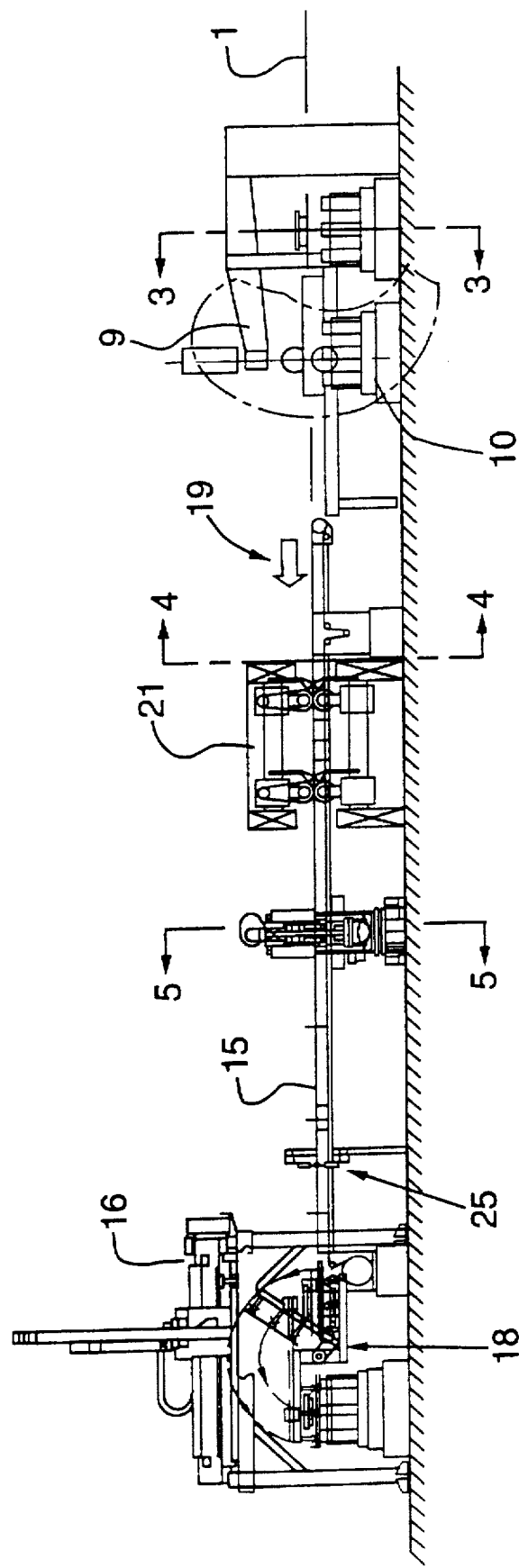
FIG. 2 is an elevation view of the apparatus shown in FIG. 1.
Figure 3:
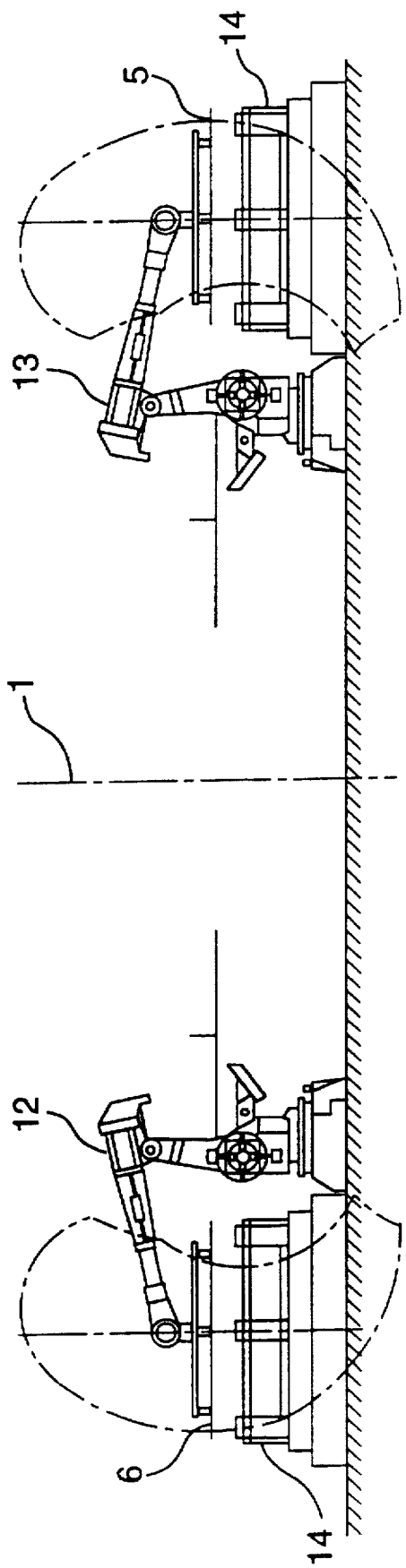
FIGS. 3, 4 and 5 are sectional elevation views along lines 3—3, 4—4, and 5—5 respectively shown in FIG. 2.
Figure 4:
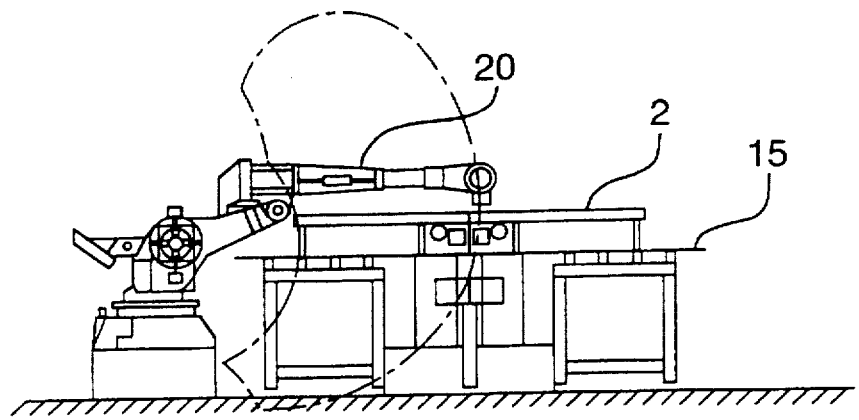
Figure 5:
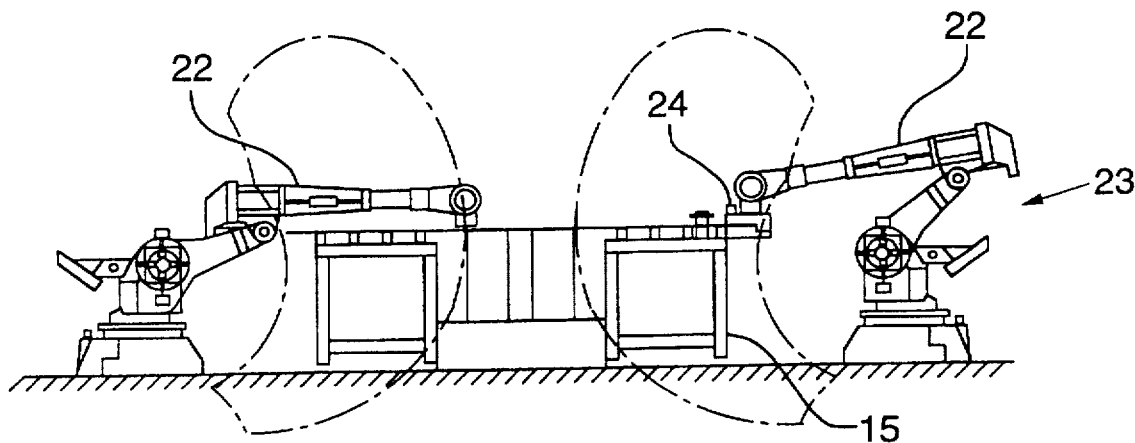

With reference to FIG. 1, one preferred embodiment of an apparatus according to the invention is illustrated wherein individual workstations have been assembled along a longitudinal central axis 1 to produce tailored blanks in a series of steps progressing from right to left as drawn.

Blanks 2, 3, and 4 illustrate the means by which a finished tailored blank 4 is incrementally assembled from four separate sheet metal component parts 5, 6, 7, and 8 along three linear weld seams. It will be understood that for completion of a blank with three weld seams, the entire process is repeated three times, once for each seam. The components are aligned, and the welded blank 2 is conveyed in stepped manner from right to left. The linear seam is at all times during processing aligned with the axis 1 of the apparatus, and the welded blank 2 is conveyed along the axis 1.

A conventional welding machine 9 is positioned with its working axis in alignment with the axis 1. To the left and right of the welder 9 axis are transversely operating assembly tables 10. The tables 10 are sized to accommodate the maximum weldment component (5–8) of the design. As illustrated, the maximum component is shown as a rectangle 11.

Two input robots 12 and 13 are used to transfer a first and a second sheet component parts 5 and 6 from their respective input stacks 14 to the assembly tables 10 of the welder 9. The welding machine 9 may, for example, be a mash welding apparatus used to weld blanks in an overlapping joint weld configuration. Alternately, the welding machine may be a butt welding apparatus which incorporates an arc or plasma welder, or more preferably, a laser welder to weld the component parts together in a butt joint weld configuration. The assembly tables 10 then move together toward the axis 1 and assemble the sheet components 5 and 6 disposed in a joint weld configuration wherein portions of the component parts 5 and 6 are moved into abutting contact in either an overlapping lap joint configuration for mash welding, or a butt joint configuration for butt welding. The joint is then welded along the linear weld seam thus defining a rough welded blank 2.

The welded blank 2 is thereafter unloaded from the assembly tables 10 to a magnetic stepping conveyor 15. The conveyor 15 conveys the welded blanks 2 in a timed step manner from the welding machine 9 to an output stacking machine 16. The completed blanks 2 are lifted from the conveyor 15 by the stacking machine 16, and are transferred to output stacks 17. The stacking machine 16 is illustrated as an overhead gantry crane shuttling between the axis 1 and output stacks 17. Also included in the stacking machine 16 is a turn over station 18 for turning the completed blanks 2 over prior to stacking.

Along the length of the magnetic stepping conveyor 15 are a series of work stations to perform further processing operations on the welded blanks 2 as required. It will be understood that each of the further operations may be bypassed or selected as required by the design and specifications of the blank 2 to be manufactured. It will also be understood that the welding and processing of blanks 2 is continuous with blanks 2 conveyed in series along the length of the conveyor 15.

After welding is complete and the blank 2 is transferred to the magnetic conveyor 15, the blank 2 is passed through a cooling station 19. In the embodiment illustrated, the cooling station 19 merely represents a portion of the conveyor 15 which has a length sufficient to allow time for the blanks 2 to air cool. It will be apparent that, if desired, the cooling station can accommodate fans, water sprays or other cooling devices to increase the speed of cooling.

A post-weld robot 20 is also located in the cooling station 19 to detect and remove rejected blanks 2, or to bypass further processing if desired. The post-weld robot 20 in some cases may also serve to load the assembly table 10 with composite welded blanks 2 and 3, or individual components 5–7.

The linear weld seam has a slight bulge of excess weld material on the top side and on the bottom side of the blank 2. In many cases the weld bulge is undesirable and therefore a weld seam grinding station 21 is provided to render the seam area flush with the rest of the blank 2. In the illustrated embodiment, the grinding station 21 comprises a frame supporting an upper and a lower grinding wheel each of which reciprocate longitudinally along the weld seam. Alternatively, wire brushes may be used to merely remove weld spatter and dress the weld seam in a wire brush abrading station 21, depending upon the requirements of the blank 2.

In most cases, the blanks 2 are to be formed into complex shapes in separate stamping operations. To aid in locating the blanks 2 into stamping dies and to assist in stacking of the stamped parts, dimples are often required to be formed on the blanks prior to stamping. A novel means is provided to form the dimples in an extremely flexible manner by using two dimpling robots 22 in a dimpling station 23.

Since it may be necessary to form a dimple at any location on a blank 2 of any shape or size within the maximum design, conventional dimpling is performed in a large punch press which is sized to accommodate the entire maximum blank size. Such dies and presses are extremely large and expensive but have heretofore been considered necessary due to the size of blanks and the need to select a wide variety of dimple locations.

Figure 6:
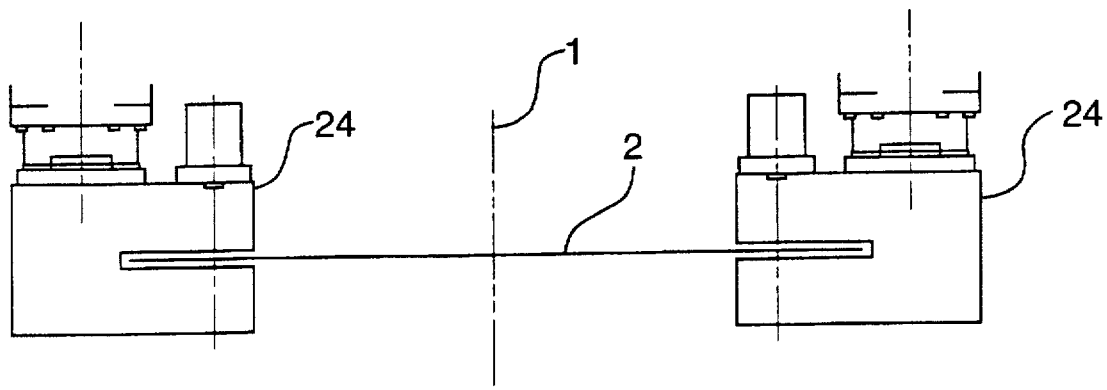
FIG. 6 is a detail sectional elevation view of the dimpling station with opposing C-frame dimple presses.

The novel dimpling station 23 eliminates the need for large dies and presses by providing dimpling robots 22 with relatively inexpensive C-frame punch presses 24 mounted to the robot arms. The robots 22 may be programmed to position a dimple at any location by inserting the edge of the blank 2 into the throat of the C-frame 24 press as illustrated in FIG. 6.

After dimpling, the blanks 2 are conveyed through an oil spray coating station 25 to coat the weld seam area to inhibit corrosion. Since the heat involved in welding often modifies the metallurgical properties of the blank 2 adjacent to the weld seam, increased corrosion resistance is required in this area.

Therefore the invention provides several advantages over convention methods and apparatii for processing and handling tailored sheet metal blanks. The integration of all process steps centered on a magnetic stepping conveyor 15 eliminates the repeated handling of conventional methods. In addition, the magnetic stepping conveyor 15 securely holds the composite blank 2 during conveyance, without the use of cumbersome clamping mechanisms. As the blank 2 does not have to be physically clamped in place, composite production time is reduced as clamping and unclamping of the composite blank 2 may occur instantly. In addition, the avoidance of clamping mechanisms facilitates further processing operations on the welded blank 2. In particular, the blank may be brush abraded or dimpled without concern of possible damage to or obstruction by a conventional clamping assembly.

The provision of a single control station 26 enables an operator using preprogrammed sequences, to produce a wide variety of blanks 2, 3, and 4 with selected dimple locations, ground welds or other features without requiring modifications to the machinery setup.

Modifications to the blank 2 features are selectively programmed into the operation of the robots and other components of the apparatus resulting in a high degree of flexibility. The logistics of planning runs of identical parts, inventory maintenance, downtime for machine modifications and intermediate handling are therefore eliminated through use of the invention.

Although FIG. 1 shows the use of input robots 12,13 as transferring the parts 5 and 6 to the assembly tables 10 of the welder 9, the invention is not so limited. If desired, the stepping conveyor 15 could also be used to convey the parts 5,6 to and along fixed assembly tables of the welder 9 with minor modifications.

While the preferred embodiment of the invention discloses the use of a welding apparatus 9 to form a linear weld seam, it is to be understood that depending on the welding apparatus selected, non-linear or curved weld seams are also possible.

Although the above description and accompanying drawings relate to a specific preferred embodiment as presently contemplated by the inventors, it will be understood that the invention in its broad aspect includes mechanical and functional equivalents of the elements described and illustrated.

I claim:

1. A method of automatically welding and handling welded tailored blank composites, each completed blank composite consisting of two or more sheet component parts of equal or unequal thickness welded together along weld seams, the method comprising the steps of:

transferring first and second sheet component parts from respective input stacks of said first and second sheet component parts to a welding machine;

assembling the sheet component parts disposed in an abutting joint configuration;

welding the joint along a weld seam thus defining a welded blank composite;

conveying the welded blank composite in a timed step manner from the welding machine to an output stacking machine via a magnetic stepping conveyor; and transferring the welded blank composite from the conveyor to an output stack of completed composites with a stacking machine.

2. A method according to claim 1 wherein said welding machine comprises a laser welding apparatus, and said abutting joint configuration comprises a butt joint configuration.

3. A method according to claim 1 wherein the step of conveying includes:

cooling the welded blank composite during conveying.

4. A method according to claim 1 wherein the step of conveying includes:

grinding the weld seam during conveying.

5. A method according to claim 1 wherein the step of conveying includes:

wire brush abrading of the weld seam during conveying.

6. A method according to claim 1 wherein the step of conveying includes:

dimpling at least one portion of the welded blank composite during conveying.

7. A method according to claim 6 wherein the step of dimpling the blank composites is performed with a C-frame punch press mounted to a dimpling robot.

8. A method according to claim 1 wherein the step of conveying includes:

oil spray coating the weld seam during conveying.

9. A method according to claim 1 wherein the step of transferring the blank composite from the conveyor to an output stack of completed composites with a stacking machine, includes turning the blank composite over prior to stacking.

10. A method according to claim 1 wherein the step of transferring first and second sheet component parts from respective input stacks of said first and second sheet component parts, to said welding machine, is performed with first and second input robots.

11. An apparatus for automatically welding and handling welded tailored blank composites, each completed blank composite consisting of two or more sheet component parts of equal or unequal thickness welded together along weld seams, the apparatus comprising:

a welding machine having an assembly table including means for assembling the sheet component parts disposed in an abutting joint configuration and means for welding the joint along a weld seam, thus defining a welded blank composite;

stacking machine means for stacking completed blank composites into an output stack;

means for transferring first and second sheet component parts from respective input stacks of said first and second parts to said assembly table of the welding machine; and magnetic conveyor means for conveying the welded blank composite in a timed step manner from the welding machine to said stacking machine means.

12. An apparatus according to claim 11 wherein the welding machine is a laser welding machine and said abutting joint configuration is a butt joint configuration.

13. An apparatus according to claim 11 wherein the magnetic conveyor means includes work stations selected from the group consisting of a weld seam grinding station, a welded blank cooling station and a wire brush seam abrading station.

14. An apparatus according to claim 11 wherein the magnetic conveyor means includes:

a weld blank dimpling station.

15. An apparatus according to claim 14 wherein the dimpling station includes a C-frame punch press mounted to a dimpling robot.

16. An apparatus according to claim 11 wherein the magnetic conveyor means includes:

a weld seam oiling station.

17. An apparatus according to claim 11 wherein the stacking machine means includes means for turning the blank composites over prior to stacking.

18. An apparatus according to claim 11 wherein the means for transferring first and second sheet component parts from respective input stacks of said first and second parts to an assembly table of a welding machine comprises first and second input robots.

* * * * *